Nov. 15, 1949            J. A. SENN            2,487,946

THERMAL RESPONSIVE DEVICE AND MOUNTING THEREFOR

Filed June 14, 1945

Inventor
JURG A. SENN
By Henry G. Bartol
Attorney

Patented Nov. 15, 1949

2,487,946

UNITED STATES PATENT OFFICE 2,487,946

THERMAL RESPONSIVE DEVICE AND MOUNTING THEREFOR

Jurg A. Senn, Washington, D. C.

Application June 14, 1945, Serial No. 599,383

15 Claims. (Cl. 297—15)

This invention relates to thermostats and particularly to devices of this class which are adapted to receive heat from the surface of a heated body and thus actuate suitable control mechanism to regulate the supply of electric current or gaseous fuel to the heat source for the body. In the control of the surface burner units of electric ranges, for example, a central opening in the burner has been provided through which a heat-transmitting or feeler member projects into surface contact with the bottom of the heated body, e. g. a cooking vessel. Through suitable switching mechanism which may be located near to or remote from the feeler member as described, the energizing circuit for the burner is opened and closed at such times as to maintain the temperature of the cooking vessel at a point corresponding to the setting of the adjustable range switch.

An object of my invention is to provide an improved heat absorber or feeler member of particular usefulness in the specific application mentioned above but useful also in other connections where efficient conversion of heat to fluid pressure is a desideratum.

Another object of my invention is to provide a feeler member which is compact, easily fabricated, of rugged construction and of relatively large contact area for its volume.

Another object of my invention is to provide a feeler element of upwardly flaring or bell-shaped contour not only for the thermal advantages inherent in such shape but also for its virtue of aiding the upward circulation of air between the feeler member and the surroundings.

Another object is to provide a feeler member and mounting for the central portion of a burner such as an electric hot plate which is effectively thermally shielded from the latter through the use of spaced, vertical baffles between which flows a natural circulation of air.

A further object is to provide a feeler member in which the expansion of a bimetal wall within the pressure-transmitting liquid serves as the principal heat-pressure conversion means.

Reference is now made to the drawing, wherein

In the design of feeler members for transmitting pressure of an enclosed fluid to a switch means, for example, located remote from the heated body several considerations govern: (1) There must be the greatest pressure change possible in the transmitting fluid per degree of temperature change of the feeler member, (2) the first requirement dictates the selection of a feeler member having a large heat contact area in relation to its volume, (3) adequate heat shielding must be provided between the feeler member and the heat source in order that the latter will not adversely affect the operation of the former, (4) the contour of the heat-receiving surface of the feeler member must engage the surface of the heated body over as large an area as possible to obtain the maximum conduction of heat, (5) for electric hot plate application particularly, the feeler member and its mounting within the plate should be of rugged construction and as free as possible from the hazards of spilled or boiled-over contents of cooking vessels. The various embodiments of my invention hereinafter described fulfill these requirements and others in an eminently satisfactory manner.

Figure 1:
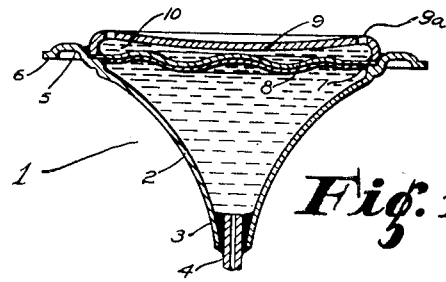
Fig. 1 is a vertical, sectional view taken centrally of one form of feeler member on an enlarged scale according to my invention.

Referring now to Fig. 1 there is shown generally at 1 a feeler member composed of a bell-shaped, rigid body 2 of metal such as stainless steel, for example, having its neck portion 3 sealed to a pressure transmitting tube 4 and its upper portion outwardly flared to provide a spring receiving channel 5 and peripheral projections 6. Inwardly of and below the channel 5 is an offset 7 to which is peripherally welded the circular, corrugated, bimetal disc 8, the central depression of which is normally adjacent the slightly-dished, contact plate 9 when the feeler member 1 is at ambient temperature. After the bimetal disc 8 has been welded in place, the downwardly turned margin of plate 9 is welded to the former and to the offset 7 as shown. The upper chamber 10 is then filled with a suitable thermally expansive fluid through apertures such as 9a after which the latter are sealed off as by welding or soldering. It will be observed that with the construction described, heat from the plate 9 will be transmitted to the bimetal 8 by conduction at its welded, peripheral connection to said plate and also through the heated fluid in chamber 10. As bimetal 8 is heated, it will deflect downwardly, forcing outwardly through the tube 4 the pressure-transmitting liquid with which the latter and the lower chamber of the body 2 are filled, and thus operate the switch means, etc. at the remote end of tube 4 as will be apparent. The pressure-transmitting liquid is of usual character such as is employed in the patents to Persons 2,272,249 or Thomson 1,289,963. Obviously, a fluid that is relatively inert as to thermal conductivity and cubical expansion coefficient is preferable since corrections due to ambient temperature effects on tube 4 will be minimized.

Figure 2:
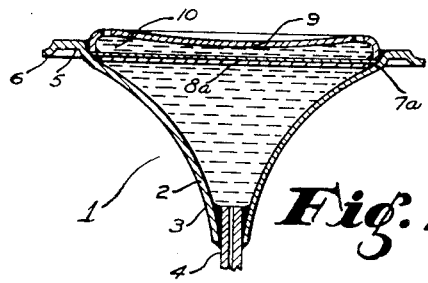
Fig. 2 is a similar view of another form of feeler member.

The modification of my invention shown in Fig. 2 is similar to that of Fig. 1 except that a flat, bimetal disc 8a is provided instead of the corrugated disc 8 of the construction first described. The flat bimetal disc is capable of a smaller, total deflection than the corrugated disc 8 but has the advantage that it may be located quite close to the plate 9, if desired. In the feeler members of both Figs. 1 and 2, it will be observed that the plate 9 is primarily a protecting and heat conducting element for the bimetals 8 and 8a since the latter's functioning would soon be impaired in normal range use without such plate. As has been stated above, the fluid selected for use in the chamber 10 must be thermally expansive in order that there will be no drag on the expansion of bimetals 8 and 8a. Various suitable fluids are well known to the art as exemplified by the patents to Weber et al. 2,303,012, Clark et al. 2,303,910 or Pierson 2,148,407. The heat conductivity of such fluid adds to the overall efficiency of my device.

Figure 3:
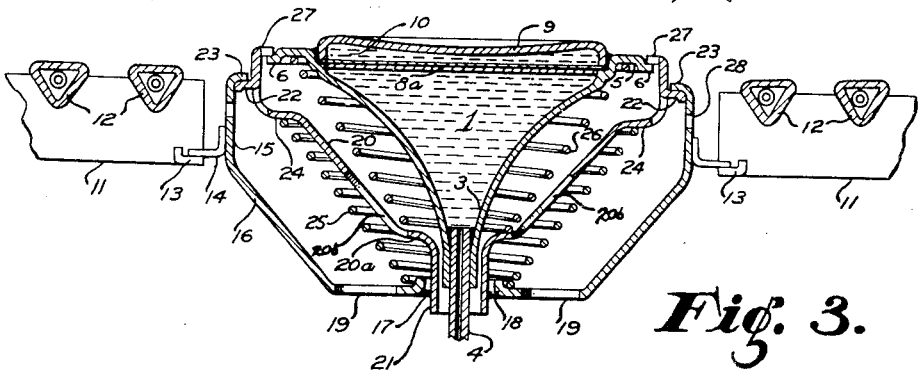
Fig. 3 is a sectional view of the feeler member of Fig. 2 in a preferred assembly in the burner.

In Fig. 3 is shown a preferred mounting of my feeler member in an electric heater plate. Herein an outer ring (not shown) uniting the radially disposed supports 11 for the spiral heater element 12 or the supports themselves may be provided with circumferentially spaced and projecting ears 13 on which rest angular projections 14 welded to or struck out from the vertical wall 15 of a generally frusto-conical, outer carrier 16. The lower end of carrier 16 has a central aperture 17 defined by an upturned ring 18 and a plurality of apertures 19 separated by radial ribs for a purpose later to be described.

An inner carrier 20 resembling the outer carrier 16 in general, but having a lower neck portion 21 guided in aperture 17 of carrier 16 and outwardly struck, circumferentially disposed projections 22 which are normally pressed upwardly into engagement with corresponding inwardly extending ears 23 of outer carrier 16, is formed with a horizontal spring base 24 between which and the lower rim-adjacent portion of outer carrier 16, the compression of generally conical spring 25 is exerted. Guided by the neck portion 21 of inner carrier 24 and pressed upwardly by a spring 26 which engages the horizontal portion 20a of the inner carrier 20 and the channel 5 of feeler member 1, the latter member is urged upwardly so that the peripheral projections 6 are in engagement with the correspondingly spaced projections 27 of the inner carrier 20. Thus, it will be seen that when a pan is placed on the burner 12, the feeler member 1 will be pressed downwardly by the central portion of the pan bottom; also as the pan settles farther, it will press projections 27 and the inner carrier down until the pan bottom is supported by coils 12, the periphery of plate 9, and projections 27.

It will be apparent that as the pan bottom is heated by coils 12, the heat will be transmitted to plate 9 and thence to bimetal disc 8a through its metallic connection thereto. As the liquid in chamber 10 is heated, it will expand as well as transmit some of its heat to the bimetal disc. Under these influences the latter will deflect downwardly, forcing the thermally inert liquid in the lower chamber (of 1) out through the tube 4. The remote end of the latter may be provided with any suitable diaphragm power unit for operating an electric switch controlling the energization of heater coils 12 as will be understood.

The location of feeler members with respect to electric or gaseous heating units is governed by the primary consideration that the former should receive not heat directly from the latter but only through the pan surface which is proximate the feeler plate. My invention accomplishes this desired effect by the provision of baffles so arranged as to shield the feeler member from radiant heat of the burner 12 and which constitute also convection paths for relatively cool, upwardly moving air. Thus in Fig. 3 air enters the openings 19, moves upwardly through a plurality of peripheral slots 20b in the inner carrier 20, passes between the projections 6 and 27 with the pan in position as well as between the individual, latter projections, across the pan bottom and up its sides. A portion of the air passing through opening 19 moves upwardly between the inner and outer carriers and passes out through the separated projections 22, 23 through the peripheral spacing thereof and through the openings 28 which although as shown as sectioned on the same plane as the apertures left by the formation of the projections 22 for clarity, are actually offset circumferentially with respect thereto so that when the feeler member is in its lower, pan-supporting position, radiant heat from coils 12 entering apertures 28 strikes the wall of carrier 24 and does not strikes the feeler member 1. Since a thermally inert fluid is used preferably in the lower chamber of the feeler member 1, the unwanted heat from the heater coil 12 does not affect the operation of my feeler member to the extent that obtains in prior art constructions of which I am aware. The effective shield from radiant heat and the air circulation provided reduce the adverse heating of feeler member 1 to a minimum. It will be apparent that the principles inherent in the construction just described are equally as applicable to a gas burner as to an electric burner. For example, a vertical tube or "chimney" of the same diameter as the bottom of the outer carrier 16 could be attached to the latter if it is desired to increase the air current through openings 19. Also apertures 28 could be shielded from the direct heat from the coils 12 by spaced baffles as desired. It will be understood that the dish-shaped plate usually provided below the radial supports 11 is in the arrangement herein described, omitted or at most limited only to the annular area immediately below the correspondingly shaped heating plate bearing coils 12.

Figure 4:
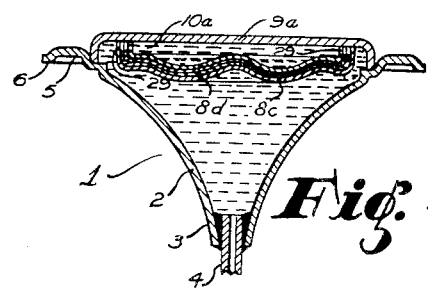
Fig. 4 is a similar view of a preferred form of feeler member.

In Fig. 4 the feeler element 1 encloses a completely sealed diaphragm assembly having a lower corrugated wall 8c and an upper corrugated wall 8d welded together at the cylindrical rim portions thereof. The latter portions are provided with one or more perforations 29 for the passage of the high thermal conductivity, low thermal expansion liquid in the feeler member 1 and are edge welded to the lower surface of the latter as shown. The diaphragm is formed by corrugating two bimetal discs between forming dies and under a selected volatile liquid such as is employed in chamber 10, thus trapping a minute quantity of the latter between the walls, or such liquid may be inserted between the diaphragm sections after forming, the purpose of the liquid being to exert a positive vapor pressure upon heating and thus eliminate any vacuum drag that might lower the expansion efficiency of the diaphragm as described in connection with Figs. 1 and 2. Since the liquid selected for the chamber of the feeler member 1 has high thermal conductivity coupled with low cubical expansion there will be appreciable heating of the diaphragm assembly thereby; the diaphragm sections 8c, 8d will be heated also through the welded connection to the plate 9a and will expand upwardly and downwardly in opposite directions to effect displacement of the maximum volume of fluid in feeler member 1.

Figure 5:
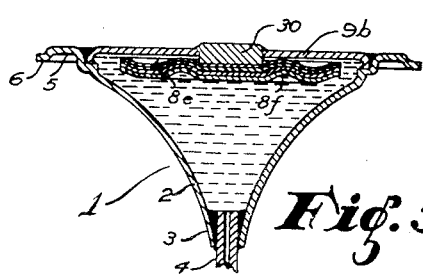
Fig. 5 is a similar view of another preferred form of feeler member.

The feeler member of Fig. 5 resembles that of Fig. 4 in that a sealed, corrugated diaphragm having upper and lower walls, 8e and 8f respectively, expands when heated to force the liquid out of the feeler member 1 but in the embodiment of Fig. 5, the central portion of the upper diaphragm wall 8e is united as by welding to a heat conductor button 30 of copper, for example, projecting through a central aperture in the contact plate 9b and welded therein. The fluids selected for the diaphragm 8e, 8f as well as feeler member 1 are the same as described for the form of the invention shown in Fig. 4.

Figure 6:
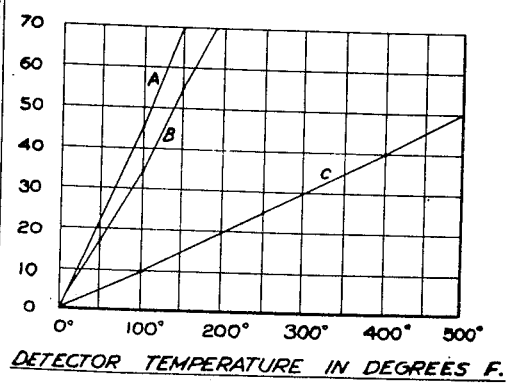
Fig. 6 is a chart showing comparative temperature-expansion curves for my improved feeler unit (Figs. 4 and 5) and one that is typical of the prior art.

The chart of Fig. 6 shows the calculated values of linear expansion in thousandths of an inch of a power element connected to the lower end of the tube 4 (Figs. 4 and 5) plotted against temperature of the detector or feeler element plate 9. Curve C shows the characteristic obtained when a hollow feeler element of the general shape of those shown in Figs. 1-5 but without the bimetal member is filled with a liquid having a high thermal expansion. The expansion is due almost entirely to the effect of the latter. Curve B shown the corresponding characteristic plotted for the feeler members of Figs. 4 and 5 as described. This displacement of fluid from the feeler member and corresponding movement of the remote power element is due entirely to the expanding bimetal diaphragm and is much greater per degree of temperature increase than in the first case. Curve A is plotted by adding the corresponding valves of curve C and curve B and reflects the expansion that it would take place if the thermal expansion fluid of curve C were used in the construction of Figs. 4 and 5 and as depicted in curve B. Ordinarily this expedient is not required with my construction due to the high expansion already available with my bimetal-diaphragm, inserted feeler members and the added unwanted heating effect that may result. It is obvious to those skilled in the art that various changes and alterations may be made in the form of the invention without altering or affecting the scope of the invention.

What I claim is:

1. A thermal responsive device comprising a bell-shaped container having an aperture in its narrowed portion and a centrally depressed, heat-transmitting wall closing its outwardly flared portion, and adapted to be filled with a pressure-transmitting fluid, and a concentrically corrugated bimetallic wall within said container and peripherally united to said heat-transmitting wall for forcing fluid through said aperture upon heating of said heat-transmitting wall the central corrugation of said bimetallic wall being upwardly curved into close proximity with said heat- transmitting wall at ambient temperature to improve the thermal efficiency of said device.

2. A thermal responsive device comprising a closed container having an apertured wall and a heat-transmitting wall and adapted to be filled with a pressure-transmitting fluid, and an expansible diaphragm adjacent said heat-transmitting wall and in heat conducting relation thereto for forcing fluid through the apertured wall upon heating of said heat-transmitting wall said diaphragm being composed of a pair of thin, concentrically corrugated, bimetallic discs in closely nested superposition at ambient temperature, peripherally sealed and entrapping therebetween a minute quantity of volatile liquid.

3. A thermal responsive device comprising a closed container having an apertured wall and a heat-transmitting wall and adapted to be filled with a pressure transmitting fluid and an expansible diaphragm adjacent said heat-transmitting wall and peripherally united thereto for forcing fluid through the apertured wall upon heating of said heat-transmitting wall said diaphragm being composed of a pair of thin, concentrically corrugated, bimetallic discs in closely nested superposition at ambient temperature, peripherally sealed and entrapping therebetween a minute quantity of volatile liquid.

4. A thermal responsive device comprising a bell-shaped container having an aperture in its narrowed portion and a heat-transmitting wall closing its outwardly flared portion and adapted to be filled with a pressure-transmitting fluid, and an expansible diaphragm adjacent said heat-transmitting wall and in heat conducting relation thereto for forcing fluid through said aperture upon heating of said heat transmitting wall said diaphragm being composed of a pair of thin, concentrically corrugated, bimetallic discs in closely nested superposition at ambient temperature, peripherally sealed and entrapping therebetween a minute quantity of volatile liquid.

5. A thermal responsive device comprising a bell-shaped container having an aperture in its narrowed portion and a heat-transmitting wall closing its outwardly flared portion and adapted to be filled with a pressure-transmitting fluid, and an expansible diaphragm centrally united to said heat-transmitting wall for forcing fluid through said aperture upon heating of said heat-transmitting wall said diaphragm being composed of a pair of thin, concentrically corrugated, bimetallic discs in closely nested superposition at ambient temperature, peripherally sealed and entrapping therebetween a minute quantity of volatile liquid.

6. A thermal responsive device comprising a bell-shaped container having an aperture in its narrowed portion and a heat-transmitting wall closing its outwardly flared portion and adapted to be filled with a pressure-transmitting fluid, a button of superior thermal conductivity embedded centrally in said wall and an expansible diaphragm centrally mounted on said button for conducting heat therefrom to said expansible diaphragm for forcing fluid through said aperture said diaphragm being composed of a pair of thin, concentrically corrugated, bimetallic discs in closely nested superposition at ambient temperature, peripherally sealed and entrapping therebetween a minute quantity of volatile liquid.

7. A thermal control unit for central placement in a range burner comprising a liquid-filled container having an upper heat-transmitting closure and an aperture in its lower portion, a peripheral flange integral with said closure but downwardly offset therefrom, a heat-shielding carrier surrounding said container in spaced relationship and having an upper, vertical wall and also a marginal portion adapted to overlie said flange, spring means disposed between said carrier and the container for centering the latter within the former and for normally maintaining the container flange against said marginal portion from which it may be moved downwardly into a freely-floating position by the weight of a cooking vessel placed thereon, said carrier being provided with apertures in its upper, vertical wall portion for the unobstructible circulation of cooling air about said container.

8. A thermal control unit for central placement in a range burner comprising a bell-shaped container having an outer surface tapering smoothly from an upper mouth portion to a lower, apertured portion and adapted to be filled with a pressure-transmitting liquid, a heat-transmitting closure for said mouth portion, a heat-shielding carrier surrounding said container in spaced relationship and provided with means for limiting the upward movement of the latter, spring means disposed between the carrier and the container for centering the latter within the former and for normally maintaining the same in its upper position from which it may be depressed into a freely-floating position by the weight of a cooking vessel placed thereon, said carrier being provided with apertures for the circulation of cooling air about said container.

9. A thermal control unit for central placement in a range burner comprising a bell-shaped container having an outer surface tapering smoothly from an upper mouth portion to a lower, apertured neck portion and adapted to be filled with a pressure-transmitting liquid, a heat-transmitting closure for said mouth portion, a heat-shielding carrier surrounding said container in spaced relationship and provided with means for limiting the upward movement of the latter, spring means for centering the container within the carrier and normally maintaining the same in its upper position, an outer heat-shielding carrier surrounding said first-named carrier in spaced relationship thereto and exposed to the radiant heat from the burner, the upper and lower portions of said carriers being provided with spaced apertures thereby forming a plurality of concentric, cooling conduits between the burner and said container.

10. A thermal control unit for central placement in a range burner comprising a bell-shaped container having an outer surface tapering smoothly from an upper mouth portion to a lower, apertured neck portion and adapted to be filled with a pressure-transmitting liquid, a heat-transmitting closure for said mouth portion, a heat-shielding carrier surrounding said container in spaced relationship and provided with means for limiting the upward movement of the latter, spring means for centering the container within the carrier and for normally maintaining the same in its upper position, an outer heat-shielding carrier surrounding said first-named carrier in spaced relationship and provided with means for limiting the upward movement of the latter, spring means for centering the first-named carrier within the last named carrier and for normally maintaining the same in its upper position, the upper and lower portions of said carriers being provided with spaced apertures thereby forming a plurality of concentric cooling conduits between the burner and container.

11. A thermal control unit for central placement in a range burner comprising a bell-shaped container having an outer surface tapering smoothly from a peripherally-flanged mouth portion to a lower, apertured neck portion and adapted to be filled with a pressure-transmitting liquid, a heat-transmitting closure for said mouth portion, a heat-shielding carrier surrounding said container in spaced relationship and provided with means engaging said flange for limiting the upward movement of said container, a spiral spring surrounding the container for centering the latter within the carrier and for normally maintaining the same in its upper position, an outer heat-shielding carrier surrounding said first-named carrier in spaced relationship thereto and provided with means for limiting the upward movement of the latter, a spiral spring surrounding the first-named carrier for centering the same within the last-named carrier and for normally maintaining the same in its upper position, the upper and lower portions of said carriers being provided with spaced apertures thereby forming a plurality of concentric cooling conduits between the burner and said container.

12. A thermal control unit for central placement in a range burner comprising a bell-shaped container having an outer surface tapering smoothly from an upper mouth portion to a lower, apertured neck portion and adapted to be filled with a pressure-transmitting liquid, a heat-transmitting closure for said mouth portion, a heat-shielding carrier surrounding said container in spaced relationship and provided with means for limiting the upward movement of the latter, spring means for centering the container within the carrier and normally maintaining the same in its upper position, an outer heat-shielding carrier surrounding said first-named carrier in spaced relationship thereto and exposed to the radiant heat from the burner, the lower portion of said carriers being provided with aligned apertures and the upper portions thereof being provided with staggered apertures thereby shielding the container from the radiant heat of the burner while forming a plurality of concentric cooling conduits between the burner and container.

13. A thermal responsive device for central placement in a range burner comprising a symmetrical, bell-shaped container having an axially extending aperture in its lower narrowed portion and terminating in an outer peripheral flange for facilitating mounting within said burner, a pressure transmitting liquid filling said container, a rigid, heat-transmitting, disc-like wall disposed above said container and having a downwardly extending periphery united to said container inwardly of said flange, bimetallic wall means disposed in said container and extending generally parallel to said heat-transmitting wall and adjacent thereto, said means having fixed metallic contact with said disc-like wall and being of approximately the same diameter whereby slight temperature changes in said latter wall will result in appreciable liquid displacement from said container.

14. A thermal responsive device for central placement in a range burner comprising a symmetrical, upwardly and outwardly curving bell-shaped container having an axially extending aperture in its lower, narrowed portion and terminating in an outer peripheral flange extending in a plane which is normal to said axis and of greater diameter than the axial height of said container for facilitating mounting within said burner, a pressure transmitting liquid filling said container, a rigid, heat-transmitting, disc-like wall disposed above said container and having a downwardly extending periphery united to said container inwardly of said flange, bimetallic wall means disposed in said container and extending generally parallel to said heat-transmitting wall and adjacent thereto, said means having fixed metallic contact with said disc-like wall and being of approximately the same diameter whereby slight temperature changes in said latter wall will result in appreciable liquid displacement from said container.

15. A thermal control unit for central placement in a range burner comprising a liquid-filled container having an upper heat-transmitting closure and an aperture in its lower portion, a peripheral flange integral with said closure, a heat-shielding carrier surrounding said container in spaced relationship and having an upper, vertical wall and also a marginal portion cooperating with said flange to limit the upward movement of the latter, spring means disposed between said carrier and the container for centering the latter within the former and for normally maintaining the container flange against said marginal portion from which it may be moved downwardly into a freely-floating position by the weight of a cooking vessel placed thereon, said carrier being provided with apertures in its upper, vertical wall portion for the unobstructible circulation of cooling air about said container.

JURG A. SENN.

REFERENCES CITED

The following references are of record in the file of this patent:

UNITED STATES PATENTS

| Number | Name | Date |
|---|---|---|
| 416,947 | Powers | Dec. 10, 1889 |
| 947,914 | Junkers | Feb. 1, 1910 |
| 1,558,081 | Gano | Oct. 20, 1925 |
| 1,633,908 | Schnepp | June 28, 1927 |
| 1,657,353 | Francke | Jan. 24, 1928 |
| 1,695,809 | Lawler | Dec. 18, 1928 |
| 1,791,020 | Wilson | Feb. 3, 1931 |
| 1,881,807 | Maurer | Oct. 11, 1932 |
| 2,118,292 | Booth | May 24, 1938 |
| 2,146,731 | Goodale | Feb. 14, 1939 |
| 2,187,258 | Wood | Jan. 16, 1940 |
| 2,272,249 | Persons | Feb. 10, 1942 |
| 2,332,518 | Koci | Oct. 26, 1943 |

FOREIGN PATENTS

| Number | Country | Date |
|---|---|---|
| 967 | Great Britain | 1904 |